R. W. V. MINOR.
SPECTACLES.
APPLICATION FILED JULY 19, 1909.
955,278.
Patented Apr. 19, 1910.
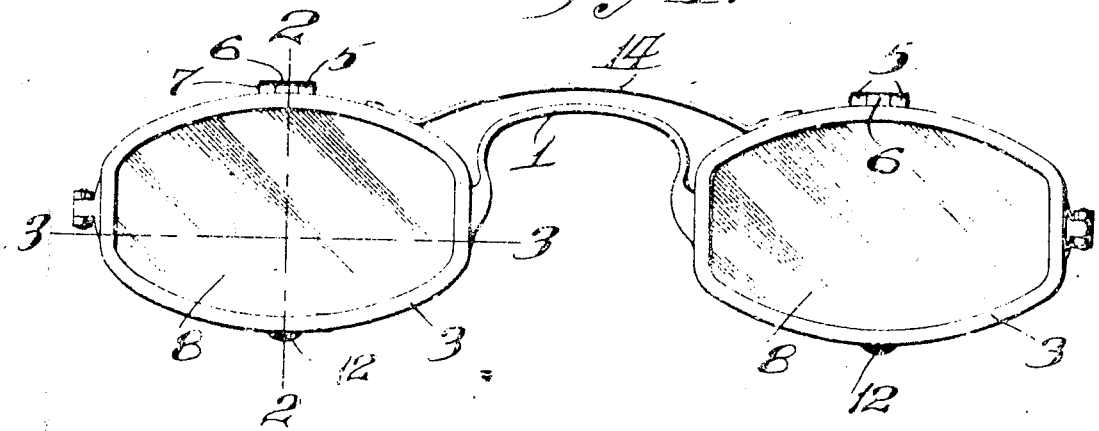
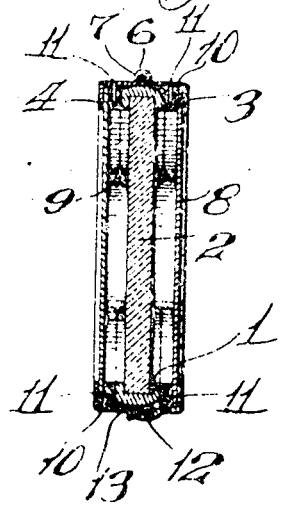
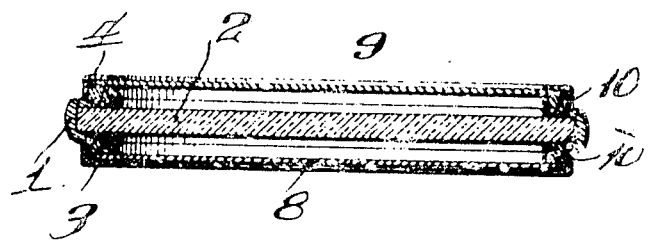
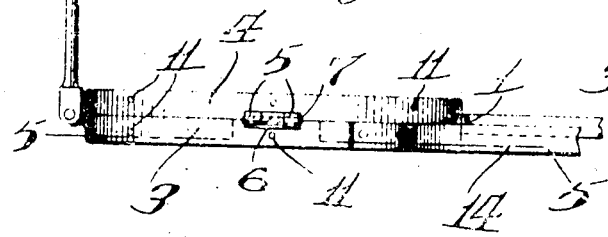
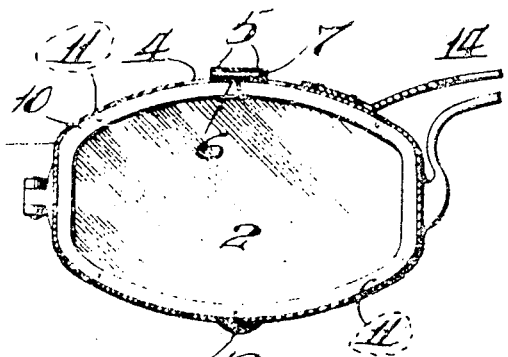
Inventor:
Robert W. V. Minor.
By Higdon & Longan
attys.

UNITED STATES PATENT OFFICE.

ROBERT W. V. MINOR, OF CLIFTON HILL, MISSOURI.

SPECTACLES.

955,278.  Specification of Letters Patent.  Patented Apr. 19, 1910.

Application filed July 19, 1909. Serial No. 508,391.

*To all whom it may concern:*

Be it known that I, ROBERT W. V. MINOR, a citizen of the United States, and resident of Clifton Hill, Randolph county, Missouri, have invented certain new and useful Improvements in Spectacles, of which the following is a specification containing a full, clear, and exact description, reference being had to the accompanying drawings, forming a part hereof.

My invention relates to improvements in spectacles, the object of my invention being to provide a detachable air and dust-tight shield for the lenses of spectacles, which shield is provided with chambers between the transparent faces of the shield to protect the glasses against "fogging" when subjected to rapid changes in temperature.

For the above purposes my invention consists in certain novel features of construction and arrangement of parts as will be hereinafter more fully set forth, pointed out in my claims and illustrated in the accompanying drawings, in which:

Figure 1 is a front elevation of a pair of spectacles having my improved shield attached thereto; Fig. 2 is an enlarged detail, transverse, sectional elevation taken on the line 2—2 of Fig. 1; Fig. 3 is an enlarged detail, horizontal section taken on the line 3—3 of Fig. 1; Fig. 4 is a plan of one of the shields, showing portions of the temple-bow and bridge broken away; and, Fig. 5 is a sectional elevation taken on the line 5—5 of Fig. 4.

Referring by numerals to the accompanying drawings: 1 designates a frame of a spectacle and 2 the lenses carried by said frame.

3 and 4 designate the front and rear frame sections of my improved shield which are pivotally connected at their top by the hinge members 5 and 6 and pintle 7. Carried by the frame sections 3 and 4 are thin transparent sheets 8 and 9 of mica, celluloid or other like material. To secure the sheets 8 and 9 within the frames 3 and 4 I have provided pads 10 which are secured to conform with the frames 3 and 4 by the pins 11.

The lower end of the frame 3 is provided with a yielding lip 12 arranged to act with a similar lip 13, carried by the frame 4 in such manner that when said lips are forced together they will secure the frames to the spectacle frame.

A bridge 14 connects the shields so that in case one shield may accidentally loosen the remaining shield will prevent the loss of the loosened shield.

When a shield of my improved construction is employed on spectacles or eye glasses the annoyance incident to the "fogging" of glasses, caused by the change of temperature from cold to heat, is obviated by reason of the lenses being incased in an air-tight inclosure and by reason of the extreme thinness of the transparent sheets the sudden changes from cold to heat will not "fog" either the sheets or lenses.

I claim:

1. In combination with a spectacle lens, a frame, thin transparent sheets carried by said frame, whereby the lens is incased in an air and dust-proof chamber.

2. In combination with a spectacle lens, a pair of frames hinged together, means for securing the frames at their margins opposite the hinge and packing carried by the frame.

3. In combination with a pair of spectacle lenses, hinged frames embracing each lens, means for securing said frames to said lenses and a bridge connecting said hinged frames.

In testimony whereof, I have signed my name to this specification, in presence of two subscribing witnesses.

ROBERT W. V. MINOR.

Witnesses:
 E. E. LONGAN,
 E. L. WALLACE.